United States Patent
Nguyen

(10) Patent No.: US 12,443,582 B2
(45) Date of Patent: Oct. 14, 2025

(54) METHODS AND SYSTEMS FOR EXTRACTING AND VISUALIZING PATTERNS IN LARGE-SCALE DATA SETS

(71) Applicant: QlikTech International AB, Lund (SE)

(72) Inventor: Khoa Tan Nguyen, Lund (SE)

(73) Assignee: Qlik Tech International AB, Lund (SE)

( * ) Notice: Subject to any disclaimer, the term of this patent is extended or adjusted under 35 U.S.C. 154(b) by 0 days.

(21) Appl. No.: 17/834,017

(22) Filed: Jun. 7, 2022

(65) Prior Publication Data

US 2022/0382733 A1    Dec. 1, 2022

Related U.S. Application Data

(63) Continuation of application No. 15/906,729, filed on Feb. 27, 2018, now Pat. No. 11,442,915.

(60) Provisional application No. 62/463,980, filed on Feb. 27, 2017.

(51) Int. Cl.
G06F 16/22 (2019.01)
G06F 16/23 (2019.01)
G06F 16/28 (2019.01)

(52) U.S. Cl.
CPC ...... *G06F 16/2282* (2019.01); *G06F 16/2379* (2019.01); *G06F 16/287* (2019.01)

(58) Field of Classification Search
CPC . G06F 16/2282; G06F 16/2379; G06F 16/287
See application file for complete search history.

(56) References Cited

U.S. PATENT DOCUMENTS

| | | | |
|---|---|---|---|
| 5,040,133 | A | 8/1991 | Feintuch |
| 5,870,748 | A | 2/1999 | Morimoto |
| 7,412,429 | B1 | 8/2008 | Syeda-Mahmood |
| 9,414,197 | B2 | 8/2016 | You |
| 9,836,183 | B1* | 12/2017 | Love ............... G06F 16/904 |
| 2004/0064269 | A1 | 4/2004 | Shibuya |
| 2006/0093240 | A1 | 5/2006 | Sabuncu |
| 2009/0106304 | A1 | 4/2009 | Song |
| 2011/0246200 | A1 | 10/2011 | Song |
| 2013/0060775 | A1* | 3/2013 | Qiu ................... G16B 40/30 |
| | | | 707/E17.089 |
| 2013/0159288 | A1* | 6/2013 | Nikankin .......... G06Q 40/03 |
| | | | 707/E17.014 |
| 2013/0159882 | A1 | 6/2013 | Wolge |

(Continued)

OTHER PUBLICATIONS

Hong-Mei et al. authoring "Design and Analysis of Minimum Spanning Tree in Euclidean Plane", IEEE, published in Oct. 2013. Download: https://ieeexplore.ieee.org/stamp/stamp.jsp?tp=&arnumber=6643178 (Year: 2013).*

(Continued)

*Primary Examiner* — Hares Jami
(74) *Attorney, Agent, or Firm* — Ballard Spahr LLP

(57) ABSTRACT

Disclosed are systems and methods for extracting and visualizing patterns in large-scale data sets. A data set comprising a plurality of data points is received. A plurality of connections between the plurality of data points is generated. Based on the plurality of connections, a plurality of groups from the plurality of data points is generated. A visual analytic comprising a plurality of geometrical shapes corresponding to the plurality of groups is generated.

20 Claims, 17 Drawing Sheets

(56) References Cited

U.S. PATENT DOCUMENTS

| | | |
|---|---|---|
| 2013/0202197 A1 | 8/2013 | Reeler |
| 2013/0230255 A1 | 9/2013 | Wang |
| 2013/0243292 A1 | 9/2013 | Khurd |
| 2014/0096085 A1 | 4/2014 | Adam |
| 2014/0108467 A1 | 4/2014 | Tutuk |
| 2014/0236625 A1 | 8/2014 | Hartman |
| 2015/0030219 A1 | 1/2015 | Madabhushi |
| 2015/0112808 A1 | 4/2015 | Coatney |
| 2015/0186461 A1* | 7/2015 | Nica ................ G06F 16/24545 707/713 |
| 2015/0186499 A1* | 7/2015 | Bak .................... G06F 16/287 707/737 |
| 2016/0012620 A1 | 1/2016 | Kanada |
| 2016/0023661 A1 | 1/2016 | Dorum |
| 2016/0133145 A1 | 5/2016 | Jacobs |
| 2016/0171764 A1 | 6/2016 | Chew |
| 2016/0246863 A1 | 8/2016 | Sexton |
| 2016/0267397 A1 | 9/2016 | Carlsson |
| 2016/0307363 A1 | 10/2016 | Zou |
| 2016/0371412 A1* | 12/2016 | Marie ................... G06F 3/0482 |
| 2017/0193075 A1* | 7/2017 | Hegelich ............ G06Q 30/0201 |
| 2017/0220902 A1 | 8/2017 | Moroney |
| 2017/0251414 A1 | 8/2017 | Ghazi-Moghadam |
| 2017/0277736 A1* | 9/2017 | Sharma ................ G06F 16/353 |
| 2017/0278016 A1* | 9/2017 | Jiang ................... G06F 16/9535 |
| 2017/0329469 A1 | 11/2017 | Baumecker |
| 2018/0007593 A1 | 1/2018 | Gormley |
| 2018/0189376 A1* | 7/2018 | Iyer ..................... G06F 18/2115 |

OTHER PUBLICATIONS

Jarvis R A: "On the identification of the convex hull of a finite set of points in the plane", Information Processing Letters, Amsterdam, NL, vol. 2, No. 1, Mar. 1973 (Mar. 1973), pp. 18-21.

Cormen H. Thomas et al: "Computational Geometry" In: "Introduction To Algorithms—Third Edition", 2009 (2009), The MIT Press, Cambridge, Massachusetts, USA, XP093003533, pp. 1014-1047.

Anonymous: "geometry—Difference between a convex hull and alpha shape—Mathematics Stack Exchange", Sep. 16, 2016 (Sep. 16, 2016), XP093003606, Retrieved from the Internet: URL:https://math.stackexchange.com/questions/1928818/difference-between-aconvex-hull-and-alpha-shape [retrieved on Nov. 30, 2022] (2 pages).

European Search Report mailed on Dec. 8, 2022 by the European Patent Office for EP Application No. 22204279.8, (Applicant—Qlik Tech International AB) (11 pages).

Xiankun Yang et al: "A novel spatial clustering algorithm based on Delaunay triangulation", Proceedings Optical Diagnostics of Living Cells II, vol. 7285, Dec. 28, 2008 (Feb. 28, 2008), p. 728530, XP055470973, US ISSN: 0277-786X, DOI: 10.1117/12813354 ISBN: 978-1-5106-1723-0.

Bernardo M. Abrego et al: "Proximity graphs inside large weighted graphs", Networks, vol. 61, No. 1, Mar. 27, 2012 (Mar. 27, 2012), pp. 29-39, XP055470683, US ISSN: 0028-3045, DOI: 10.1002/net.21464.

Liu D et al: "Effective clustering and boundary detection algorithm based on Delaunay triangulation", Pattern Recognition Letters, Elsevier, Amsterdam, NL, vol. 29, No. 9, Jul. 1, 2008 (Jul. 1, 2008), pp. 1261-1273, XP022663895, ISSN: 0167-8655, DOI: 10.1016/J.PATREC.2008.01.028 [retrieved on Feb. 15, 2008].

Oleksandr Grygorash et al: "Minimum Spanning Tree Based Clustering Algorithms", Tools With Artificial Intelligence, 18th IEEE International Conference ON, IEEE, PI, Nov. 1, 2006 (Nov. 1, 2006), pp. 73-81, XP031031423, ISBN: 978-0-7695-2728-4.

European Search Report mailed on Mar. 26, 2020 by the European Patent Office for EP Application No. 18158402.0, (Applicant—Qlik Tech International AB) (7 pages).

* cited by examiner

FIG. 4

| Client | Year | Sum (Number * Price) |
|---|---|---|
| Nisse | 1999 | 19.5 |
| Gullan | 1999 | 37.5 |
| Kalle | 1999 | 60 |
| Pekka | <NULL> | 75 |
| <ALL> | 1999 | 117 |
| <ALL> | <NULL> | 75 |
| Nisse | <ALL> | 19.5 |
| Gullan | <ALL> | 37.5 |
| Kalle | <ALL> | 60 |
| Pekka | <ALL> | 75 |
| <ALL> | <ALL> | 192 |

Table 6

Sum (Number * Price) Per Client, Year

|  | 1999 | <NULL> | <ALL> |
|---|---|---|---|
| Nisse | 19.5 |  | 19.5 |
| Gullan | 37.5 |  | 37.5 |
| Kalle | 60 |  | 60 |
| Pekka |  | 75 | 75 |
| <ALL> | 117 | 75 | 192 |

Table 7

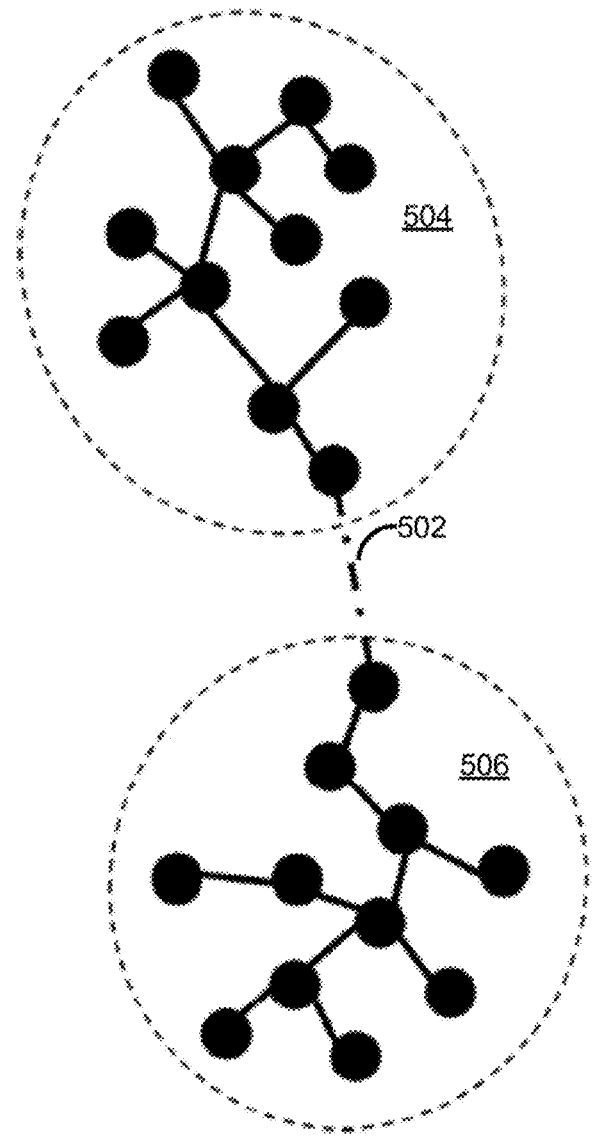

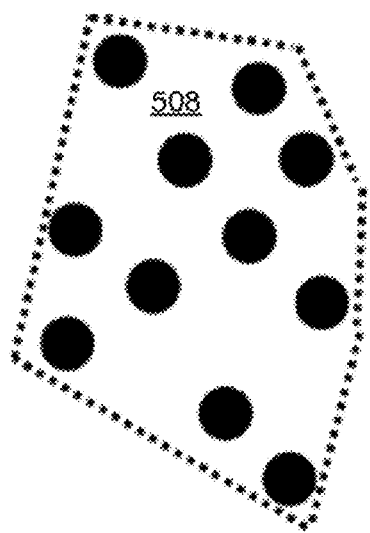
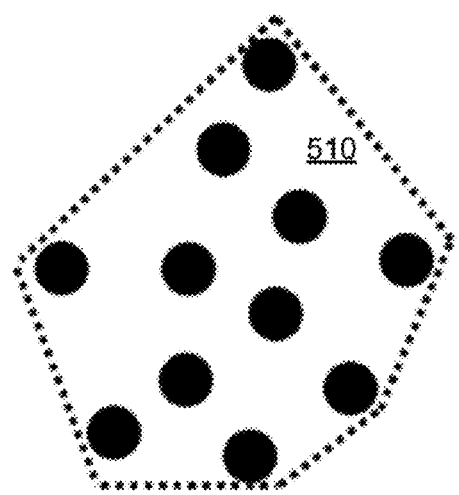
FIG. 5C

FIG. 5D
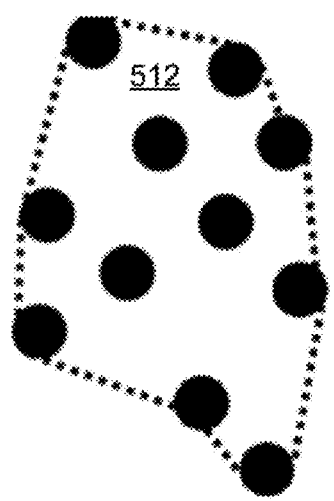
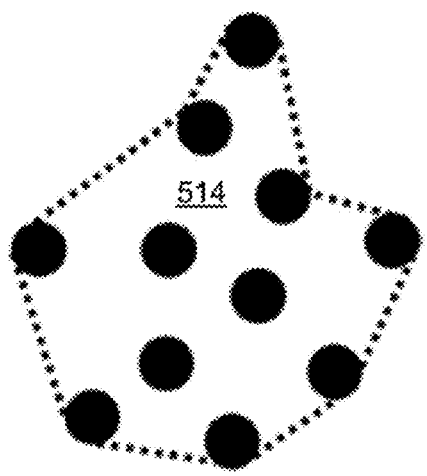

FIG. 5E
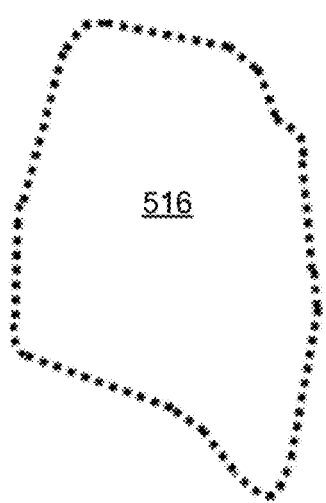
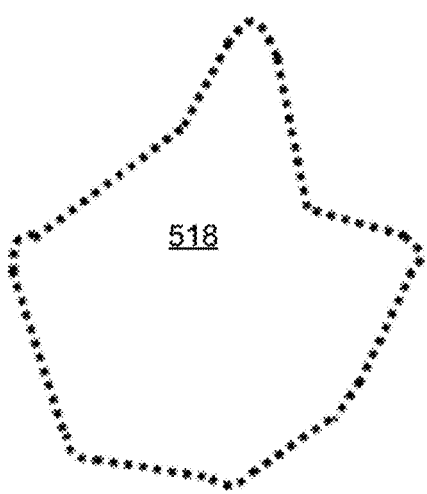

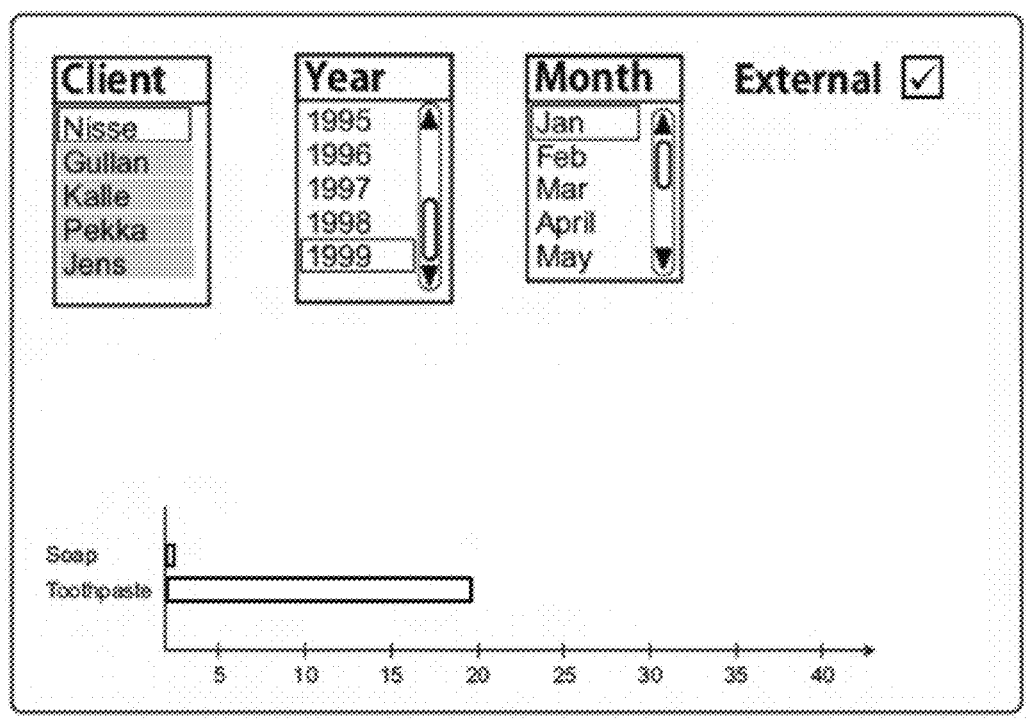

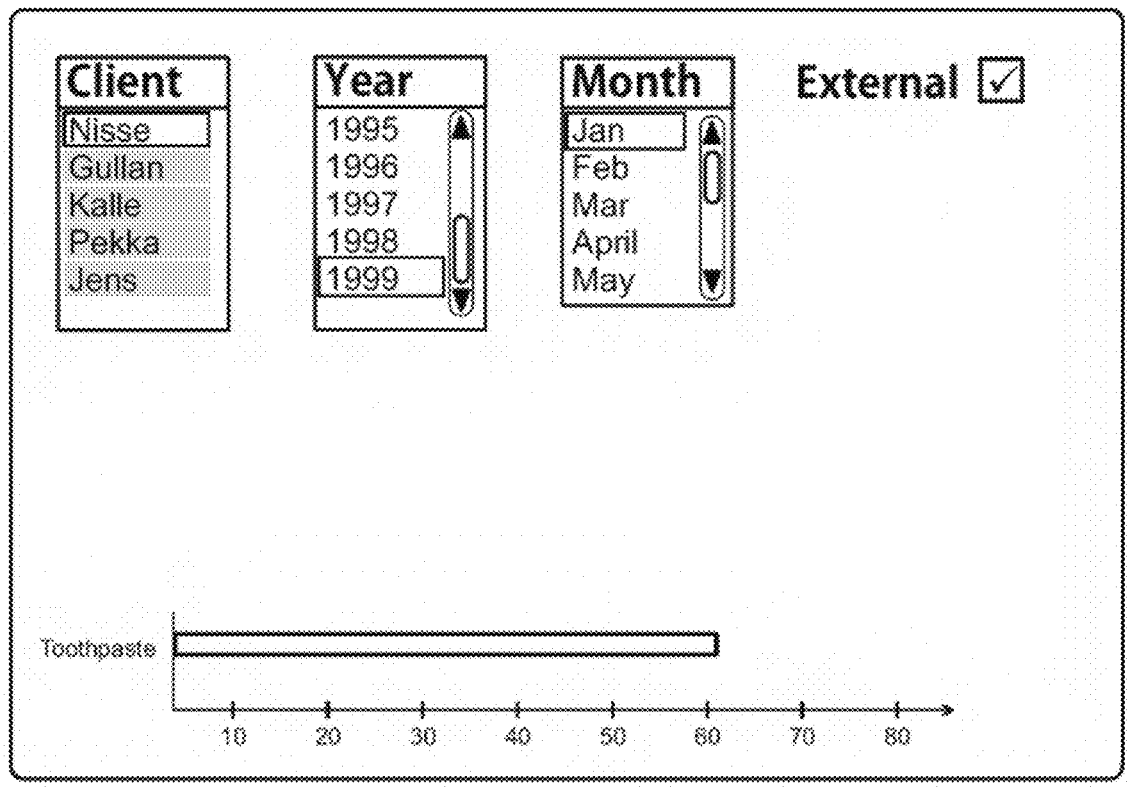

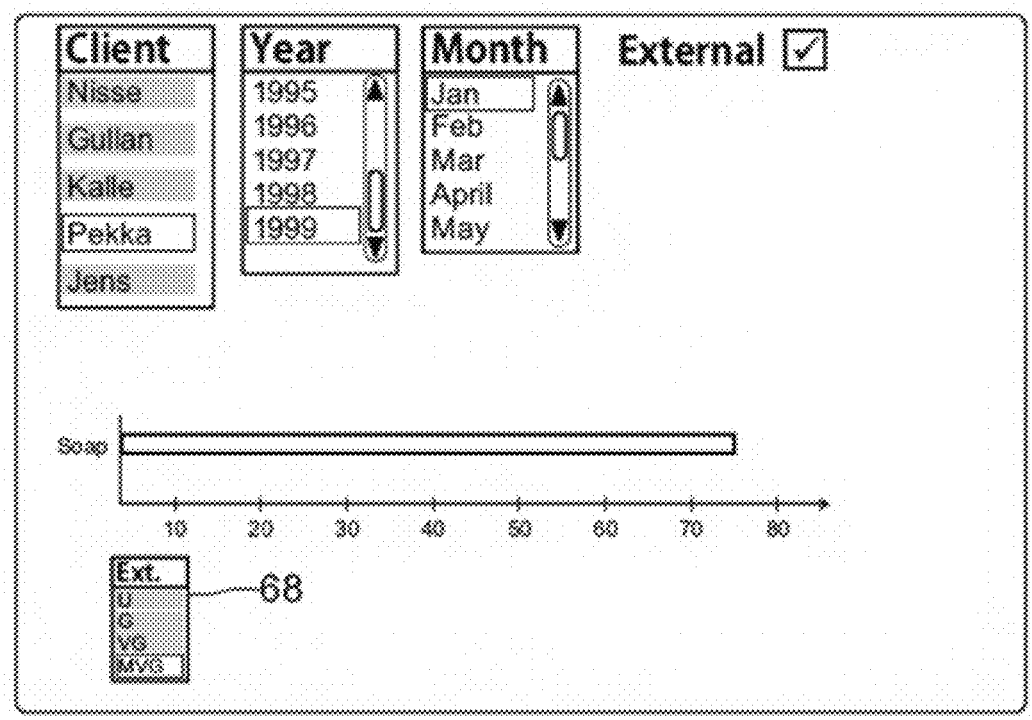

METHODS AND SYSTEMS FOR EXTRACTING AND VISUALIZING PATTERNS IN LARGE-SCALE DATA SETS

CROSS REFERENCE TO RELATED PATENT APPLICATIONS

This application is a continuation of U.S. Non-Provisional application Ser. No. 15/906,729, filed on Feb. 27, 2018, which claims priority to U.S. Provisional Application No. 62/463,980, filed on Feb. 27, 2017, both of which are incorporated by reference herein in their entireties.

SUMMARY

It is to be understood that both the following general description and the following detailed description are exemplary and explanatory only and are not restrictive, as claimed. Provided are methods and systems for data management and analysis.

In an aspect, a method can comprise receiving a data set comprising a plurality of data points, generating a plurality of connections between the plurality of data points, generating, based on the plurality of connections, a plurality of groups from the plurality of data points, and generating a visual analytic comprising a plurality of geometrical shapes corresponding to the plurality of groups.

In an aspect, a system can comprise at least one computing device configured to at least receiving a data set comprising a plurality of data points, generating a plurality of connections between the plurality of data points, generating, based on the plurality of connections, a plurality of groups from the plurality of data points, and generating a visual analytic comprising a plurality of geometrical shapes corresponding to the plurality of groups.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is tables showing a final data structure, e.g. a multidimensional cube, created by evaluating mathematical functions;

FIG. 5A-E are example representations of data plots for calculating a minimum spanning tree;

FIG. 6 is a schematic graphical presentation showing selections and a diagram of data associated to the selections as received after processing by an external engine;

FIG. 7 is a schematic representation of data exchanged with an external engine based on selections in FIG. 6;

FIG. 8 is a schematic graphical presentation showing selections and a diagram of data associated to the selections as received after second computations from an external engine;

FIG. 9 is a schematic representation of data exchanged with an external engine based on selections in FIG. 8;

FIG. 10 is a schematic graphical presentation showing selections and a diagram of data associated to the selections as received after third computations from an external engine;

FIG. 11 is a schematic representation of data exchanged with an external engine based on selections in FIG. 10;

FIG. 12 is a table showing results from computations based on different selections in the presentation of FIG. 10;

DETAILED DESCRIPTION

Figure 1:
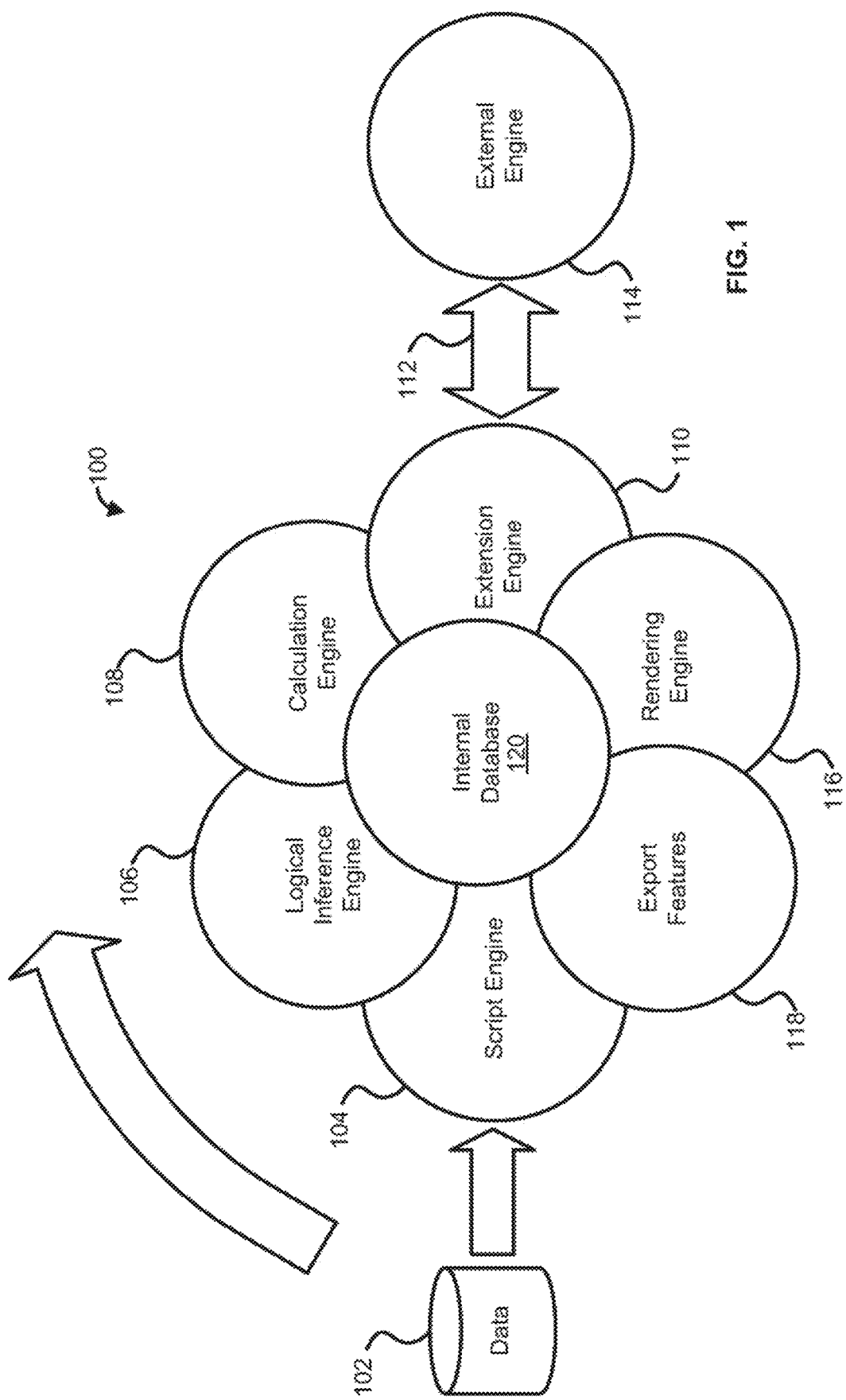
FIG. 1 is a schematic diagram showing an embodiment of a system forming an implementation of the disclosed methods.

Before the present methods and systems are disclosed and described in more detail, it is to be understood that the methods and systems are not limited to specific steps, processes, components, or structure described, or to the order or particular combination of such steps or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers or steps. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Steps and components described herein as being used to perform the disclosed methods and construct the disclosed systems are exemplary unless the context clearly dictates otherwise. It is to be understood that when combinations, subsets, interactions, groups, etc. of these steps and components are disclosed, that while specific reference of each various individual and collective combinations and permutation of these may not be explicitly disclosed, each is specifically contemplated and described herein, for all methods and systems. This applies to all aspects of this application including, but not limited to, steps in disclosed methods and/or the components disclosed in the systems. Thus, if there are a variety of additional steps that can be performed or components that can be added, it is understood that each of these additional steps can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked or cloud based.

Embodiments of the methods and systems are described below with reference to diagrams, flowcharts and other illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to computer implemented methods and systems for data management, data analysis, and processing. The disclosed methods and systems facilitate visual analytics of large spatial/temporal data sets. Metrics can be used to identify closeness between data points. Input data are classified into separate groups through a hierarchical-based clustering approach representing the underlain patterns in the data. Each cluster is represented by a geometric shape in which the distribution of data points are used to highlight the trends (sub-patterns) in the derived patterns.

In an aspect, data points in a data set can be classified into groups. For example, to group the data points, a Delaunay triangulation can be applied to the data points after being plotted. A minimum spanning tree (MST) can be extracted from the Delaunay triangulation. A supervised or unsupervised classification can be applied to the MST to generate the groups of data points. Shape extraction may be performed on the groups of data points. For example, a convex hull covering all items in a group can be constructed. The final shapes for clustering can be generated by extracting edges of the convex hull. These final shapes can then be provided as a visual analytic of the overall data plot.

FIG. 1 illustrates an associative data indexing engine 100 with data flowing in from the left and operations starting from a script engine 104 and going clockwise (indicated by the clockwise arrow) to export features 118. Data from a data source 102 can be extracted by a script engine 104. The data source 102 can comprise any type of known database, such as relational databases, post-relational databases, object-oriented databases, hierarchical databases, flat files, spread sheet, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a data set.

In an aspect, the extraction of the data can comprise extracting an initial data set or scope from the data source 102, e.g. by reading the initial data set into the primary memory (e.g. RAM) of the computer. The initial data set can comprise the entire contents of the data source 102 base, or a subset thereof. The internal database 120 can comprise the extracted data and symbol tables. Symbol tables can be created for each field and, in one aspect, can only contain the distinct field values, each of which can be represented by their clear text meaning and a bit filled pointer. The data tables can contain said bit filled pointers.

In the case of a query of the data source 102, a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. A result of scope definition can be a data set.

Once the data has been extracted, a user interface can be generated to facilitate dynamic display of the data. By way of example, a particular view of a particular dataset or data subset generated for a user can be referred to as a state space or a session. The methods and systems can dynamically generate one or more visual representations of the data to present in the state space.

A user can make a selection in the data set, causing a logical inference engine 106 to evaluate a number of filters on the data set. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g. indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second can represent whether or not a value selection is possible. For every click in an application, states and colors for all field values can be calculated. These can be referred to as state vectors, which can allow for state evaluation propagation between tables.

The logical inference engine 106 can utilize an associative model to connect data. In the associative model, all the fields in the data model have a logical association with every other field in the data model. Depending on the amount of data, the data model can be too large to be loaded into memory. To address this issue, the logical inference engine 106 can generate one or more indexes for the data model. The one or more indexes can be loaded into memory in lieu of the data model. The one or more indexes can be used as the associative model. An index is used by database management programs to provide quick and efficient associative access to a table's records. An index is a data structure (for example, a B-tree, a hash table, and the like) that stores attributes (e.g., values) for a specific column in a table. A B-tree is a self-balancing tree data structure that keeps data sorted and allows searches, sequential access, insertions, and deletions in logarithmic time. The B-tree is a generalization of a binary search tree in that a node can have more than two children. A hash table (also referred to as a hash index) can comprise a collection of buckets organized in an array. A hash function maps index keys to corresponding buckets in the hash index.

Queries that compare for equality to a string can retrieve values very fast using a hash index. For instance, referring to the tables of FIG. 2, a query of SELECT*FROM Table 2 WHERE Client='Kalle') could benefit from a hash index created on the Client column. In this example, the hash index would be configured such that the column value will be the key into the hash index and the actual value mapped to that key would just be a pointer to the row data in Table 2. Since a hash index is an associative array, a typical entry can comprise "Kalle=>0x29838", where 0x29838 is a reference to the table row where Kalle is stored in memory. Thus, looking up a value of "Kalle" in a hash index can return a reference to the row in memory which is faster than scanning Table 2 to find all rows with a value of "Kalle" in the Client column. The pointer to the row data enables retrieval of other values in the row.

Thus, the logical inference engine 106 can determine a data subset based on user selections. The logical inference engine 106 automatically maintains associations among every piece of data in the entire data set used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine will work associating values or binary symbols into the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

Based on current selections and possible rows in data tables a calculation/chart engine 108 can calculate aggregations in objects forming transient hyper cubes in an application. The calculation/chart engine 108 can further build a virtual temporary table from which aggregations can be made. The calculation/chart engine 108 can perform a calculation (e.g., evaluate an expression in response to a user selection/de-selection) via a multithreaded operation. The state space can be queried to gather all of the combinations of dimensions and values necessary to perform the calculation. In an aspect, the query can be on one thread per object, one process, one worker, combinations thereof, and the like. The expression can be calculated on multiple threads per object. Results of the calculation can be passed to a rendering engine 116 and/or optionally to an extension engine 110.

Figure 5A:
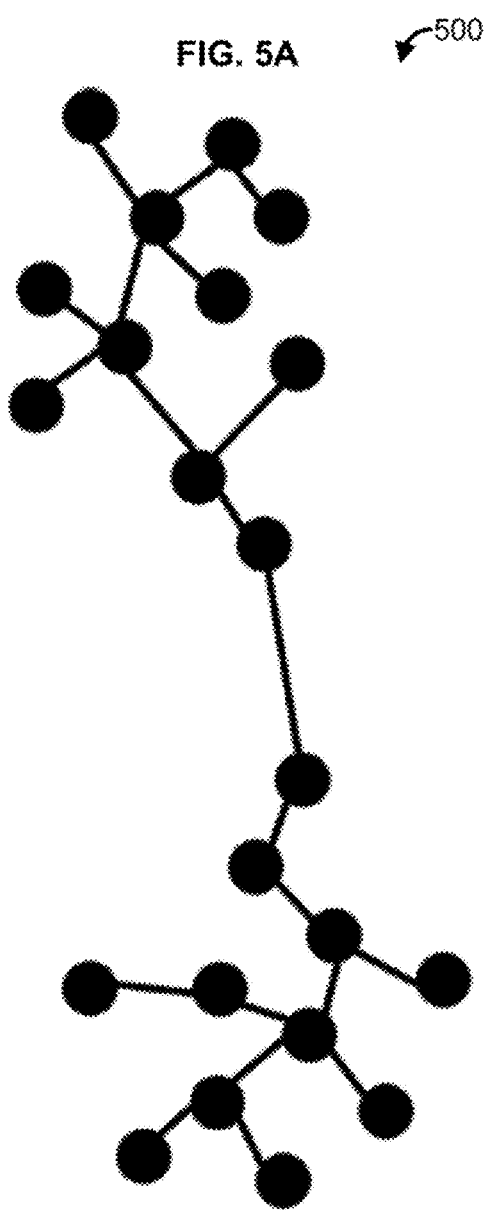

For example, the calculation/chart engine 108 can extract geometric representations of groups from large-scale data sets that can be rendered by the rendering engine 116. In an aspect, this can include introducing connectivity between a set of secrete data points. In an aspect, this can include finding a minimum spanning tree (MST) connecting each of the data points as illustrated in FIG. 5A, showing an example MST 500. In another aspect, this can include applying a Delaunay triangulation to the data points, and then finding the MST from the resulting Delaunay triangulation. Although it is not required to perform the Delaunay triangulation before finding the MST, finding the MST from the Delaunay triangulation results in improved performance when compared to finding the MST directly from the data points. In an aspect, a distance metric can be used to calculate the MST. This distance metric can include, for example, a Euclidean distance, a Manhattan distance, or other distance metric as can be appreciated.

Next, in an aspect, the calculation/chart engine 108 classifies the data points into groups. In an aspect, this can be performed by letting $w_i$ denote the length of the i-th edge in the constructed topology, $\overline{w}$ be the average length of the constructed edges, and a be the standard deviation of the length of the edges. The separation of the input data points into groups can be achieved by removing edges that have the length that satisfies the following condition:

$w_i \geq \bar{w} + \sigma$, $i=1, \ldots, n$ where n is the number of constructed edges. This process can be described as "coarse classification." In an aspect, a maximum number of groups can be defined. Thus, for a maximum number of groups N, a maximum N−1 edges can be removed. In another aspect, a predefined number of groups can be defined. In such an aspect, for a predefined number of groups M, the M−1 longest edges can be removed. As illustrated in FIG. 5B, by removing the longest edge 502 which satisfies the above equation, the resulting data set is categorized into two non-overlapping groups 504 and 506.

The result of the course classification process can lead to a high number of groups that may hinder user perceptibility and the ability to interact with renderings of the data. Accordingly, the result of the coarse classification process can be improved through an iterative process based on inter-/intra-group similarity measurements. While the intra-similarity is a metric that reflects the closeness of data points within each data group, the inter-similarity measures the level of separation between data groups.

For example, let $G=\{G_1, G_2, \ldots, G_K\}$ be the set of non-overlapping groups from the coarse classification process, the intra-group similarity of the group $G_i$ can be defined as:

$$intra_i = \frac{1}{|G_i|} \sum_j^{|G_i|} |p_{ij} - c_i|$$

where $|G_i|$ is the number of data points contained in the group $G_i$, $c_i$ is the centroid of the group $G_i$, $p_{ij}$ is the data points j in the group.

The inter-group similarity can be similarly defined as:

$$inter = \frac{1}{|G|} \sum_{\substack{i,j \\ i \neq j}}^{|G|} |c_i - c_j|$$

where $|G|$ is the number of groups. In an aspect, the number of groups $|G|$ can be defined by user input, or by another approach.

The present method iteratively goes through the result of the coarse classification process and selects groups that should be merged based on the criterion that decreases the intra-group similarity measurement while increasing the inter-group similarity measurement.

After generating groups of data points, the calculation/chart engine 108 extracts geometrical representations of the derived groups that facilitate an interactive visualization and analysis of large scale data. For example, instead of rendering a large number of individual discrete data points using points or circles, a complex shape representing the structure of the group can be used, thus dramatically reducing the amount of rendering required. Additionally, by utilizing density information within each group, a heatmap-based rendering technique can be employed to convey the distribution as well as trends (sub-patterns) inside the group.

In an aspect, generating the geometrical representations can begin with the calculation of convex hulls as illustrated in FIG. 5C, including convex hulls 508 and 510. As convex hulls do not necessarily have to adhere to the complex structure of the derived group, the hull should be optimized in a way that can capture the complex geometric shape of the group as described below. In an aspect, calculating the convex hulls of the groups can be performed according to Lee's algorithm, a Graham scan, or another approach.

Based on the calculated convex hull, the present method iteratively enhances the edges of the hull so that the resulting geometrical shape adheres to the complex structure of the group. Particularly, for each edge in the convex hull, the five nearest neighbor data points can be identified. It is understood that other numbers of nearest neighbor data points can also be identified. The distance between these neighbors data points to the edge is used as a criterion to split the edge in such a way that does not cut into the internal structure and guarantee that the hull adhere closely to the complex structure of the group. For example, given a group of data points including data points A and B linked by an edge of the convex hull. Edge AB can have nearest neighbors C and D. While an edge AC or CB would cut into the internal structure of the hull, edges AD and DB would not. Thus, edge AB is replaced with edges AD and DB. The process is iteratively performed until no edges remain that can be split into new edges that do not cut into the internal structure of the hull.

FIG. 5D illustrates the result of the present method, including optimized hulls 512 and 514. While the convex hull can be used directly as a visual representation of the derived groups (see FIG. 5C), the present method provides better shapes that reflect the actual complex shape of the groups. Although the result is can be equivalent to an a-shape calculation, the approach set forth herein provides a higher performance since the need to perform a triangulation is avoided. Geometrical representations 516 and 518 of the derived groups can be illustrated in FIG. 5E. Such representations can be rendered by the rendering engine 116 to facilitate an interaction with the derived groups or their respective data points.

Optionally, the extension engine 110 can be implemented to communicate data via an interface 112 to an external engine 114. In another aspect, the extension engine 110 can communicate data, metadata, a script, a reference to one or more artificial neural networks (ANNs), one or more commands to be executed, one or more expressions to be evaluated, combinations thereof, and the like to the external engine 114. The interface 114 can comprise, for example, an Application Programming Interface (API). The external engine 114 can comprise one or more data processing applications (e.g., simulation applications, statistical applications, mathematical computation applications, database applications, combinations thereof, and the like). The external engine 114 can be, for example, one or more of MATLAB®, R, Maple®, Mathematica®, combinations thereof, and the like.

In an aspect, the external engine 114 can be local to the associative data indexing engine 100 or the external engine 114 can be remote from the associative data indexing engine 100. The external engine 114 can perform additional calculations and transmit the results to the extension engine 110 via the interface 112. A user can make a selection in the data model of data to be sent to the external engine 114. The logical inference engine 106 and/or the extension engine 110 can generate data to be output to the external engine 114 in a format to which the external engine 114 is accustomed to processing. In an example application, tuples forming a hypercube can comprise two dimensions and one expression, such as (Month, Year, Count (ID)), ID being a record identification of one entry. Then said tuples can be exchanged with the external engine 114 through the interface 112 as a table. If the data comprise births there can be timestamps of the births and these can be stored as month and year. If a selection in the data model will give a set of month-year values that are to be sent out to an external unit, the logical inference engine 106 and/or the extension engine 110 can ripple that change to the data model associatively and produce the data (e.g., set and/or values) that the external engine 114 needs to work with. The set and/or values can be exchanged through the interface 112 with the external engine 114. The external engine 114 can comprise any method and/or system for performing an operation on the set and/or values. In an aspect, operations on the set and/or values by the external engine 114 can be based on tuples (aggregated or not). In an aspect, operations on the set and/or values by the external engine 114 can comprise a database query based on the tuples. Operations on the set and/or values by the external engine 114 can be any transformation/operation of the data as long as the cardinality of the result is consonant to the sent tuples/hypercube result.

In an aspect, tuples that are transmitted to the external engine 114 through the interface 112 can result in different data being received from the external engine 114 through the interface 112. For example, a tuple consisting of (Month, Year, Count (ID)) should return as 1-to-1, m-to-1 (where aggregations are computed externally) or n-to-n values. If data received are not what were expected, association can be lost. Transformation of data by the external engine 114 can be configured such that cardinality of the results is consonant to the sent tuples and/or hypercube results. The amount of values returned can thus preserve associativity.

Results received by the extension engine 110 from the external engine 114 can be appended to the data model. In an aspect, the data can be appended to the data model without intervention of the script engine 104. Data model enrichment is thus possible "on the fly." A natural work flow is available allowing clicking users to associatively extend the data. The methods and systems disclosed permit incorporation of user implemented functionality into a presently used work flow. Interaction with third party complex computation engines, such as MATLAB® or R, is thus facilitated.

The logical inference engine 106 can couple associated results to the external engine 114 within the context of an already processed data model. The context can comprise tuple or tuples defined by dimensions and expressions computed by hypercube routines. Association is used for determination of which elements of the present data model are relevant for the computation at hand. Feedback from the external engine 114 can be used for further inference inside the inference engine or to provide feedback to the user.

A rendering engine 116 can produce a desired graphical object (charts, tables, etc) based on selections/calculations. For example, representations of the resulting optimized hulls as disclosed in FIG. 5E can be rendered by the rendering engine 116. When a selection is made on a rendered object there can be a repetition of the process of moving through one or more of the logical inference engine 106, the calculation/chart engine 108, the extension engine 110, the external engine 114, and/or the rendering engine 116. The user can explore the scope by making different selections, by clicking on graphical objects to select variables, which causes the graphical object to change. At every time instant during the exploration, there exists a current state space, which is associated with a current selection state that is operated on the scope (which always remains the same).

Different export features or tools 118 can be used to publish, export or deploy any output of the associative data indexing engine 100. Such output can be any form of visual representation, including, but not limited to, textual, graphical, animation, audio, tactile, and the like.

Figure 2:
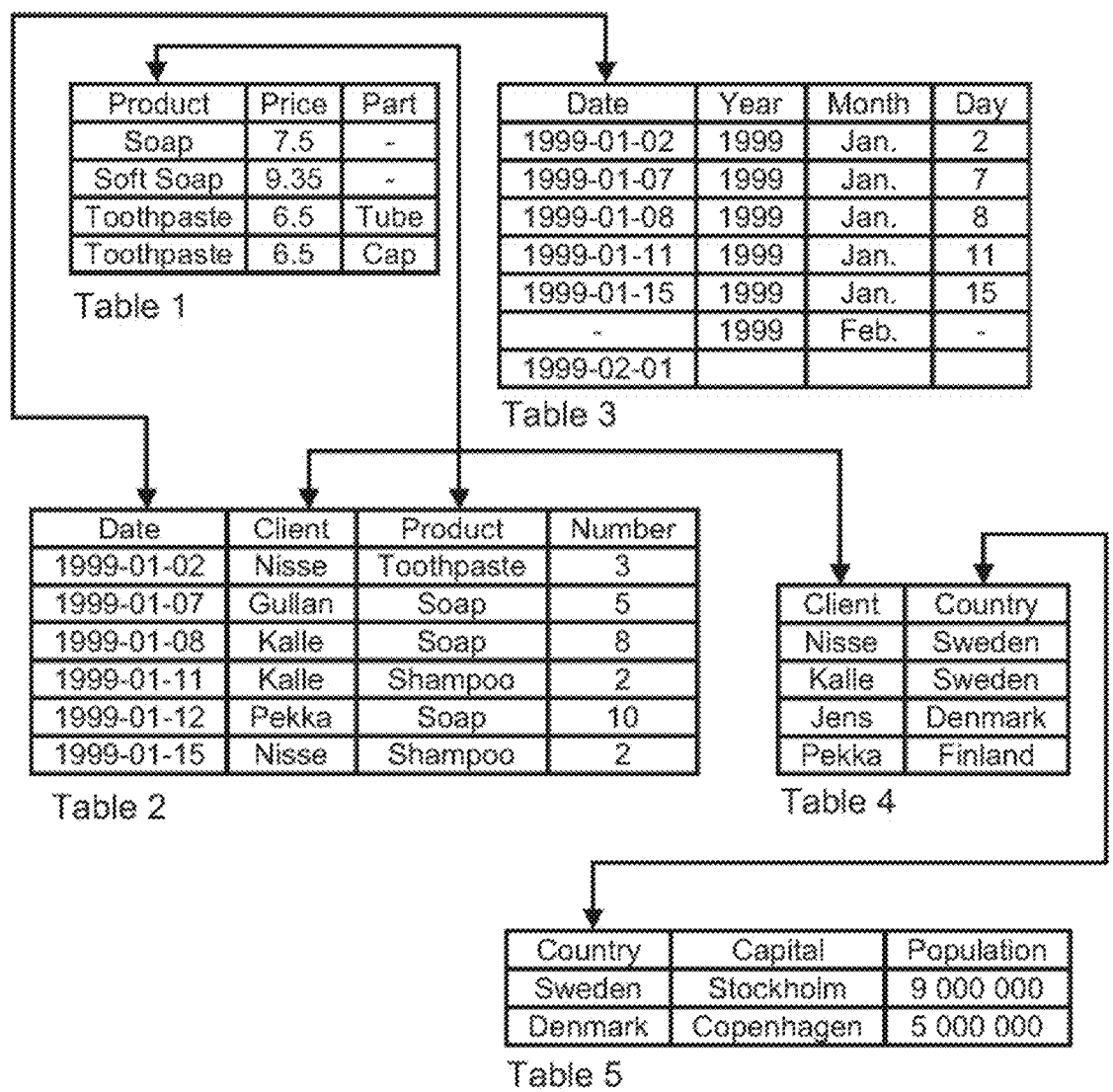
FIG. 2 is a set of tables showing exemplary Tables 1-5 of a simple database and associations between variables in the tables.

An example database, as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Figure 3:
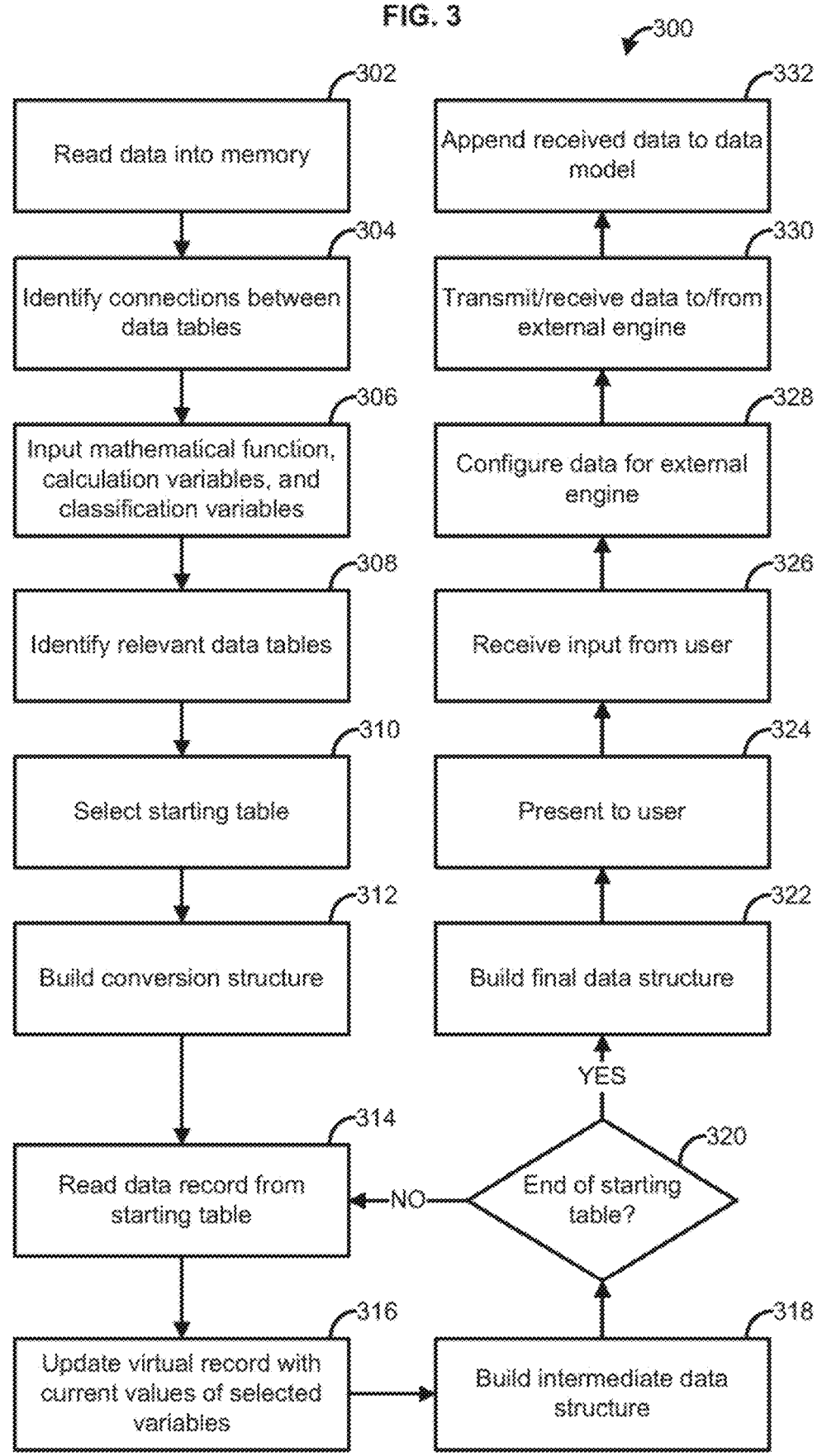
FIG. 3 is a schematic flowchart showing basic steps performed when extracting information from a database.

The methods provided can be implemented by means of a computer program as illustrated in a flowchart of a method 300 in FIG. 3. In a step 302, the program can read some or all data records in the database, for instance using a SELECT statement which selects all the tables of the database, e.g. Tables 1-5. In an aspect, the database can be read into primary memory of a computer.

To increase evaluation speed, each unique value of each data variable in said database can be assigned a different binary code and the data records can be stored in binary-coded form. This can be performed, for example, when the program first reads the data records from the database. For each input table, the following steps can be carried out. The column names, e.g. the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the program can analyze the database in a step 304 to identify all connections between the data tables. A connection between two data tables means that these data tables have one variable in common. In an aspect, step 304 can comprise generation of one or more bidirectional table indexes and one or more bidirectional associative indexes. In an aspect, generation of one or more bidirectional table indexes and one or more bidirectional associative indexes can comprise a separate step. In another aspect, generation of one or more bidirectional table indexes and one or more bidirectional associative indexes can be on demand. After the analysis, all data tables are virtually connected. In FIG. 2, such virtual connections are illustrated by double ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can explore the database. In doing so, the user defines in a step 306 a mathematical function, which could be a combination of mathematical expressions. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and "Year."

The computer program then identifies in a step 308 all relevant data tables, e.g. all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of step 308.

In the present example, all occurrences of every value, e.g. frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in a step 310, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"). These connecting variables link the starting table (Table 2) to the boundary tables (Tables 1 and 3).

Thereafter, a conversion structure can be built in a step 312. This conversion structure can be used for translating each value of each connecting variable ("Date," "Product") in the starting table (Table 2) into a value of a corresponding selected variable ("Year," "Price") in the boundary tables (Table 3 and 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999 Jan. 12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") is linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in a step 314 from the starting table (Table 2). Then, the value of each selected variable ("Client", "Number") in the current data record of the starting table can be incorporated in the virtual data record in a step 316. Also, by using the conversion structure each value of each connecting variable ("Date", "Product") in the current data record of the starting table can be converted into a value of a corresponding selected variable ("Year", "Price"), this value also being incorporated in the virtual data record.

In a step 318 the virtual data record can be used to build an intermediate data structure. Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The above procedure can be repeated for one or more additional (e.g., all) data records of the starting table. In a step 320 it can be checked whether the end of the starting table has been reached. If not, the process can be repeated from step 314 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL or a hash structure. The aggregation field can be implemented as a summation register, in which the result of the evaluated mathematical expression is accumulated.

In some aspects, e.g. when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

When the intermediate data structure has been built, a final data structure, e.g., a multidimensional cube, as shown in non-binary notation in Table 6 of FIG. 4, can be created in a step 322 by evaluating the mathematical function ("SUM (x*y)") based on the results of the mathematical expression ("x*y") contained in the intermediate data structure. In doing so, the results in the aggregation fields for each unique combination of values of the classification variables can be combined. In the example, the creation of the final data structure is straightforward, due to the trivial nature of the present mathematical function. The content of the final data structure can be presented to the user, for example in a two-dimensional table, in a step 324, as shown in Table 7 of FIG. 4. Alternatively, if the final data structure contains many dimensions, the data can be presented in a pivot table, in which the user can interactively move up and down in dimensions, as is well known in the art. At step 326, input from the user can be received. For example, input form the user can be a selection and/or de-selection of the presented results.

Optionally, input from the user at step 326 can comprise a request for external processing. In an aspect, the user can be presented with an option to select one or more external engines to use for the external processing. Optionally, at step 328, data underlying the user selection can be configured (e.g., formatted) for use by an external engine. Optionally, at step 330, the data can be transmitted to the external engine for processing and the processed data can be received. The received data can undergo one or more checks to confirm that the received data is in a form that can be appended to the data model. For example, one or more of an integrity check, a format check, a cardinality check, combinations thereof, and the like. Optionally, at step 332, processed data can be received from the external engine and can be appended to the data model as described herein. In an aspect, the received data can have a lifespan that controls how long the received data persists with the data model. For example, the received data can be incorporated into the data model in a manner that enables a user to retrieve the received data at another time/session. In another example, the received data can persist only for the current session, making the received data unavailable in a future session.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

The database as referred to in Tables 1-5 of FIG. 2 can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user with various visualization techniques and objects such as list boxes of a user interface illustrated in FIG. 6.

The graphical objects (or visual representations) can be substantially any display or output type including graphs, charts, trees, multi-dimensional depictions, images (computer generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

The result of a standard query can be a smaller subset of the data within the database, or a result set, which is comprised of the records, and more specifically, the data element types and data element values within those records, along with any calculated functions, that match the specified query. For example, as indicated in FIG. 6, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "January" are selected in a similar way.

Optionally, in this application, external processing can also be requested by ticking "External" in the user interface of FIG. 6. Data as shown in FIG. 7 can be exchanged with an External engine 64 through the interface 66 of FIG. 5. In addition to evaluating the mathematical function ("SUM (Price*Number)") based on the results of the mathematical expression ("Price*Number") contained in the intermediate data structure the mathematical function ("SUM (ExtFunc (Price*Number))") can be evaluated. Data sent out are (Nisse, 1999, January, {19.5, null}). In this case the external engine 64 can process data in accordance with the formula if (x==null)

y=0.5 else y=x as shown in in FIG. 7. The result input through the interface 66 will be (19.5, 0.5) as reflected in the graphical presentation in FIG. 6.

In a further aspect, external processing can also be optionally requested by ticking "External" in a box as shown in FIG. 8. Data as shown in FIG. 9 can be exchanged with an external engine 64 through the Interface 66 of FIG. 5. In addition to evaluating the mathematical function ("SUM (Price*Number)") based on the results of the mathematical expression ("Price*Number") contained in the intermediate data structure the mathematical function SUM (ExtFunc(Price*Number))

can be evaluated. Data sent out are (Nisse, 1999, January, {19.5, null}). In this case the external engine 64 will process data in accordance with Function (1) as shown below and in FIG. 9. The result input through the Interface 66 will be (61.5) as reflected in the graphical presentation in FIG. 8.

$$y = ExtAggr(x[]) \qquad \text{Function (1)}$$
$$\text{for}(x \text{ in } x[])$$
$$\text{if}(x == \text{null})$$
$$y = y + 42$$
$$\text{else}$$
$$y = y + x$$

A further optional embodiment is shown in FIG. 10 and FIG. 11. The same basic data as in previous examples apply. A user selects "Pekka," "1999," "January," and "External." By selecting "External," already determined and associated results are coupled to the external engine 64. Feedback data from the external engine 64 based on an external computation, ExtQualification(Sum(Price*Number)), as shown in FIG. 12 will be the information "MVG." This information can be fed back to the logical inference engine 18. The information can also be fed back to the graphical objects of FIG. 10 and as a result a qualification table 68 will highlight "MVG" (illustrated with a frame in FIG. 10). Other values (U, G, and VG) are shown in gray areas. The result input through the Interface 66 will be Soap with a value of 75 as reflected in the graphical presentation (bar chart) of FIG. 10.

Should a user instead select "Gullan," "1999," "January," and "External," the feedback signal would include "VG" based on the content shown in qualification table 68. The computations actually performed in the external engine 62 are not shown or indicated, since they are not relevant to the inference engine.

Figure 13:
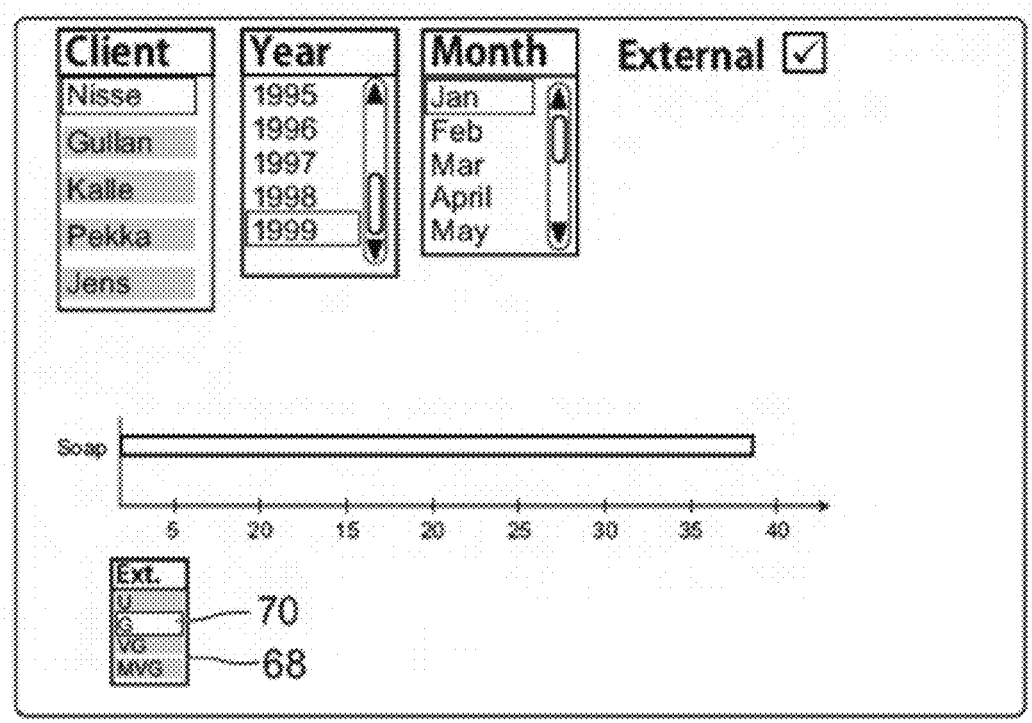
FIG. 13 is a schematic graphical presentation showing a further set of selections and a diagram of data associated to the selections as received after third computations from an external engine.

In FIG. 13 a user has selected "G" as depicted by 70 in the qualification table 68. As a result information fed back from the external engine 64 to the external engine 62 and further to the inference engine 18 the following information will be highlighted: "Nisse," "1999," and "January" as shown in FIG. 13. Furthermore, the result produced will be Soap 37.5 as reflected in the graphical presentation (bar chart) of FIG. 13.

Figure 14:
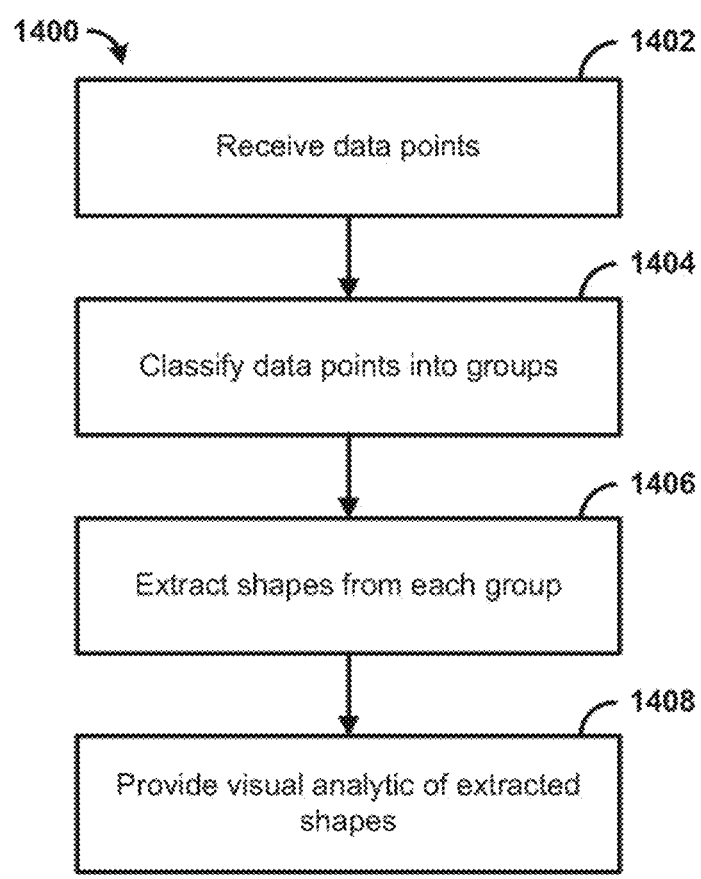
FIG. 14 is a flow chart illustrating an example method.

In an aspect, illustrated in FIG. 14 provided is a method 1400 comprising receiving a data model at 1402. The data model can comprise a plurality of tables and the plurality of tables each can comprise at least one row and at least one column. Next, in step 1404, the data points can be classified into groups, as described in more detail in FIG. 15. Using the resulting groups, in step 1406, shapes can be extracted from each group as described in more detail in FIG. 16. The resulting groups are provided as a visual analytic in step 1408 by a rendering engine 116. In an aspect, the visual analytic can facilitate an interactive visualization and analysis of large scale data. For example, instead of rendering a large number of individual discrete data points using points or circles, a complex shape representing the structure of the group can be used, thus dramatically reducing the amount of rendering required. Additionally, by utilizing density information within each group, a heatmap-based rendering technique can be employed to convey the distribution as well as trends (sub-patterns) inside the group.

Figure 15:
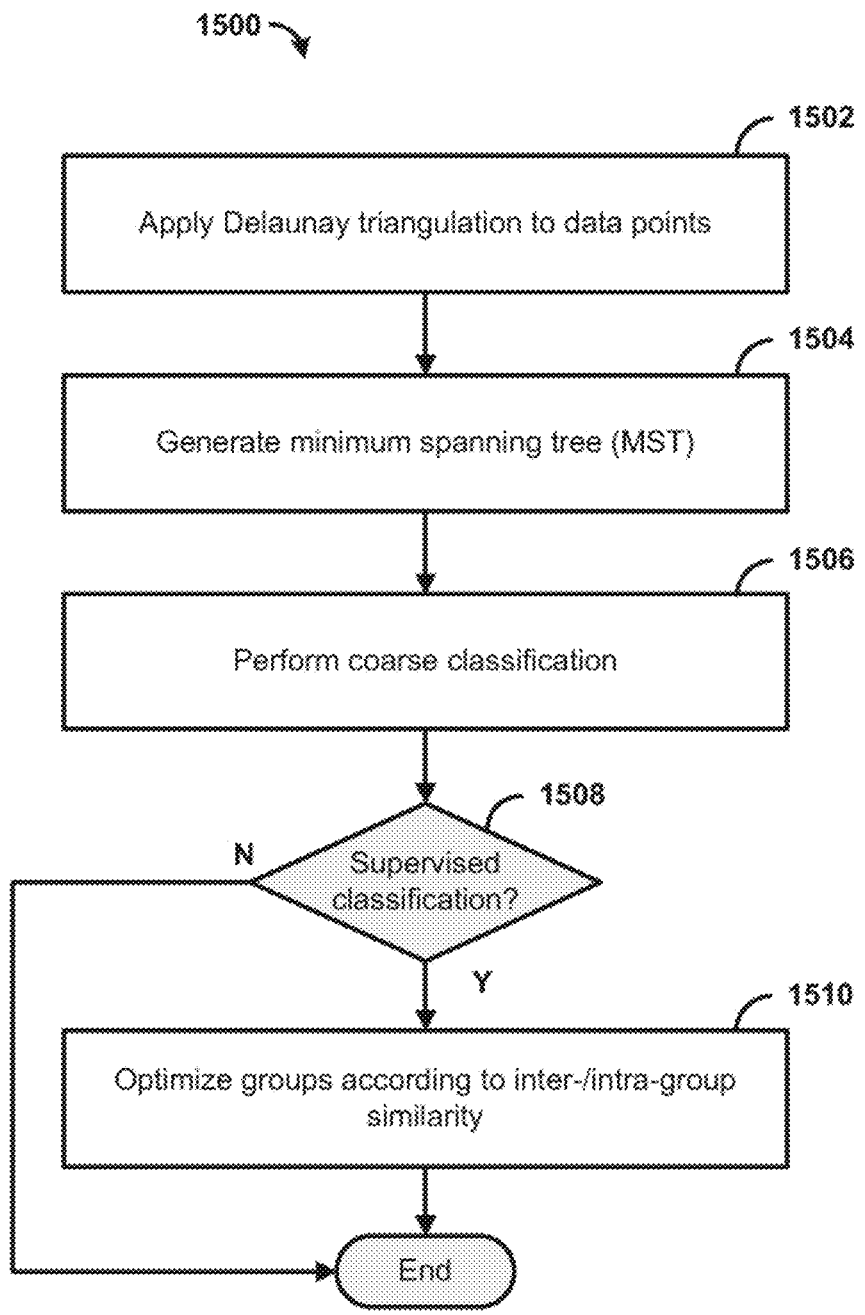
FIG. 15 is a flow chart illustrating another example method.

Turning now to FIG. 15, provided is a method 1500 for grouping data points into groups as referenced in step 1404 of FIG. 14. To begin, at step 1502, a Delaunay triangulation is applied to provided data points in order to introduce connectivity between the data points. Next, in step 1504, a minimum spanning tree (MST) for the data points is generated from the Delaunay triangulation. In an aspect, a distance metric can be used to calculate the MST. This distance metric can include, for example, a Euclidean distance, a Manhattan distance, or other distance metric as can be appreciated. Next, in step 1506, the data points are grouped using coarse classification. In an aspect, coarse classification can include letting $w_i$ denote the length of the i-th edge in the constructed topology, $\overline{w}$ be the average length of the constructed edges, and $\sigma$ be the standard deviation of the length of the edges. The separation of the input data points into groups can be achieved by removing edges that have the length that satisfies the following condition:

$$w_i \geq \overline{w} + \sigma, \ i=1, \ldots, n$$

where n is the number of constructed edges. In an aspect, a maximum number of groups can be defined. Thus, for a maximum number of groups N, a maximum N−1 edges can be removed. In another aspect, a predefined number of groups can be defined. In such an aspect, for a predefined number of groups M, the M−1 longest edges can be removed.

At step 1508, if a supervised classification is being performed, the process advances to step 1510 where the results of the coarse classification are optimized according to inter-/intra group similarity. In an aspect, supervised classification can be performed if a predefined or maximum number if groups is not set for the result of the course classification, but can be defined for the result of inter-/intra-group similarity optimization. Thus, any number of groups resulting from coarse classification may be provided as input to the supervised classification to generate a predefined or maximum number of groups. While the intra-similarity is a metric that reflects the closeness of data points within each data group, the inter-similarity measures the level of separation between data groups.

For example, let $G=\{G_1, G_2, \ldots, G_K\}$ be the set of non-overlapping groups from the coarse classification process, the intra-group similarity of the group $G_i$ can be defined as:

$$intra_i = \frac{1}{|G_i|} \sum_j^{|G_i|} |p_{ij} - c_i|$$

where $|G_i|$ is the number of data points contained in the group $G_i$, $c_i$ is the centroid of the group $G_i$, $p_{ij}$ is the data points j in the group.

The inter-group similarity can be similarly defined as:

$$inter = \frac{1}{|G|} \sum_{\substack{i,j \\ i \neq j}}^{|G|} |c_i - c_j|$$

where |G| is the number of groups. In an aspect, the number of groups |G| can be defined by user input, or by another approach.

The present method iteratively goes through the result of the coarse classification process and selects groups that should be merged based on the criterion that decreases the intra-group similarity measurement while increasing the inter-group similarity measurement.

Returning to step 1508, if supervised classification is not being performed (i.e. unsupervised classification), step 1510 is omitted. The method 1500 can be considered to use unsupervised classification if there is a predefined number or maximum number of groups resulting from the coarse classification.

Figure 16:
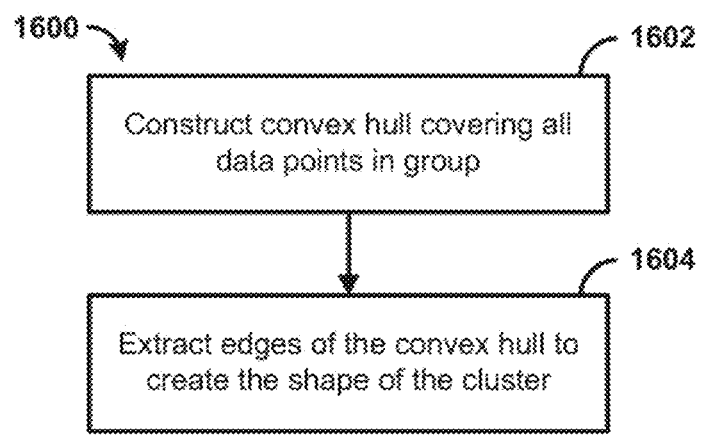
FIG. 16 is a flow chart illustrating another example method.

Referring next to FIG. 16, shown is a method 1600 for extracting shapes from the groups of data points as referenced in step 1402 of FIG. 14. In an aspect, the groups of data points can be generated according to the method 1500 described in FIG. 15. To begin, in step 1602, convex hulls can be generated for each group of data points. In an aspect, calculating the convex hulls of the groups can be performed according to Lee's algorithm, a Graham scan, or another approach.

Next, in step 1604, the edges of the convex hulls are extracted to create the optimized shapes for each group. In an aspect, this can include, for each edge in the convex hull, identifying the five nearest neighbor data points. It is understood that other numbers of nearest neighbor data points can also be identified. The distance between these neighbors data points to the edge is used as a criterion to split the edge in such a way that does not cut into the internal structure and guarantee that the hull adhere closely to the complex structure of the group. For example, given a group of data points including data points A and B linked by an edge of the convex hull. Edge AB can have nearest neighbors C and D. While an edge AC or CB would cut into the internal structure of the hull, edges AD and DB would not. Thus, edge AB is replaced with edges AD and DB. The process is iteratively performed until no edges remain that can be split into new edges that do not cut into the internal structure of the hull.

Figure 17:
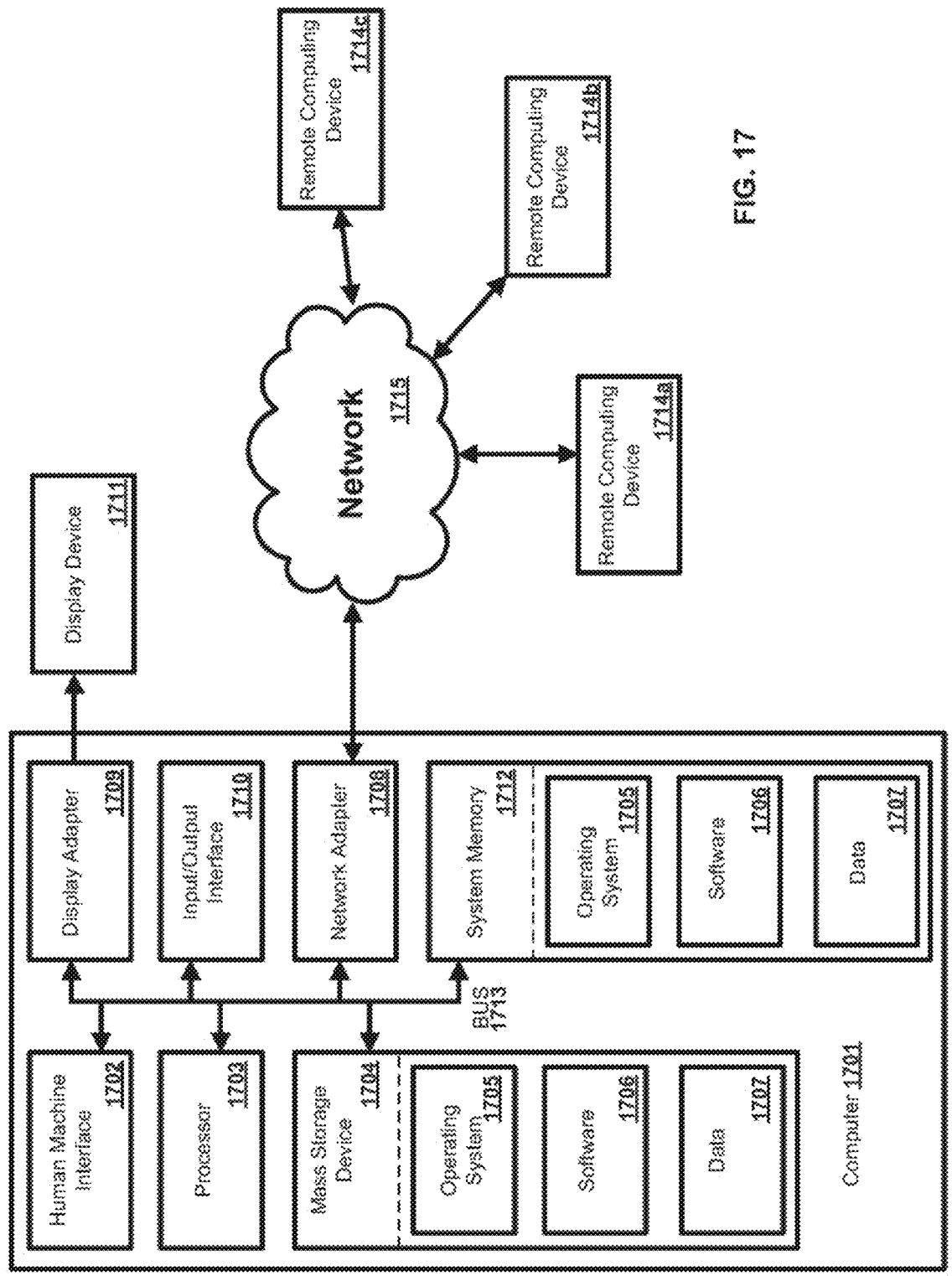
FIG. 17 is an exemplary operating environment for performing the disclosed methods.

In an exemplary aspect, the methods and systems can be implemented on a computer 1701 as illustrated in FIG. 17 and described below. Similarly, the methods and systems disclosed can utilize one or more computers to perform one or more functions in one or more locations. FIG. 17 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1701. The components of the computer 1701 can comprise, but are not limited to, one or more processors 1703, a system memory 1712, and a system bus 1713 that couples various system components including the one or more processors 1703 to the system memory 1712. The system can utilize parallel computing.

The system bus 1713 represents one or more of several possible types of bus structures, including a memory bus or memory controller, a peripheral bus, an accelerated graphics port, or local bus using any of a variety of bus architectures. The bus 1713, and all buses specified in this description can also be implemented over a wired or wireless network connection and each of the subsystems, including the one or more processors 1703, a mass storage device 1704, an operating system 1705, associative data indexing engine software 1706, data 1707, a network adapter 1708, the system memory 1712, an Input/Output Interface 1710, a display adapter 1709, a display device 1711, and a human machine interface 1702, can be contained within one or more remote computing devices 1714a,b,c at physically separate locations, connected through buses of this form, in effect implementing a fully distributed system.

The computer 1701 typically comprises a variety of computer readable media. Exemplary readable media can be any available media that is accessible by the computer 1701 and comprises, for example and not meant to be limiting, both volatile and non-volatile media, removable and non-removable media. The system memory 1712 comprises computer readable media in the form of volatile memory, such as random access memory (RAM), and/or non-volatile memory, such as read only memory (ROM). The system memory 1712 typically contains data such as the data 1707 and/or program modules such as the operating system 1705 and the associative data indexing engine software 1706 that are immediately accessible to and/or are presently operated on by the one or more processors 1703.

In another aspect, the computer 1701 can also comprise other removable/non-removable, volatile/non-volatile computer storage media. By way of example, FIG. 17 illustrates the mass storage device 1704 which can provide non-volatile storage of computer code, computer readable instructions, data structures, program modules, and other data for the computer 1701. For example and not meant to be limiting, the mass storage device 1704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1704, including by way of example, the operating system 1705 and the associative data indexing engine software 1706. Each of the operating system 1705 and the associative data indexing engine software 1706 (or some combination thereof) can comprise elements of the programming and the associative data indexing engine software 1706. The data 1707 can also be stored on the mass storage device 1704. The data 1707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In an aspect, the associative data indexing engine software 1706 can comprise one or more of a script engine, a logical inference engine, a calculation engine, an extension engine, and/or a rendering engine. In an aspect, the associative data indexing engine software 1706 can comprise an external engine and/or an interface to the external engine.

In another aspect, the user can enter commands and information into the computer 1701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1703 via the human machine interface 1702 that is coupled to the system bus 1713, but can be connected by other interface and bus structures, such as a parallel port, game port, an IEEE 1394 Port (also known as a Firewire port), a serial port, or a universal serial bus (USB).

In yet another aspect, the display device 1711 can also be connected to the system bus 1713 via an interface, such as the display adapter 1709. It is contemplated that the computer 1701 can have more than one display adapter 1709 and the computer 1701 can have more than one display device 1711. For example, the display device 1711 can be a monitor, an LCD (Liquid Crystal Display), or a projector. In addition to the display device 1711, other output peripheral devices can comprise components such as speakers (not shown) and a printer (not shown) which can be connected to the computer 1701 via the Input/Output Interface 1710. Any step and/or result of the methods can be output in any form to an output device. Such output can be any form of visual representation, including, but not limited to, textual, graphical, animation, audio, tactile, and the like. The display device 1711 and computer 1701 can be part of one device, or separate devices.

The computer 1701 can operate in a networked environment using logical connections to one or more remote computing devices 1714*a,b,c*. By way of example, a remote computing device can be a personal computer, portable computer, smartphone, a server, a router, a network computer, a peer device or other common network node, and so on. Logical connections between the computer 1701 and a remote computing device 1714*a,b,c* can be made via a network 1715, such as a local area network (LAN) and/or a general wide area network (WAN). Such network connections can be through the network adapter 1708. The network adapter 1708 can be implemented in both wired and wireless environments. Such networking environments are conventional and commonplace in dwellings, offices, enterprise-wide computer networks, intranets, and the Internet. In an aspect, one or more of the remote computing devices 1714*a, b,c* can comprise an external engine and/or an interface to the external engine.

For purposes of illustration, application programs and other executable program components such as the operating system 1705 are illustrated herein as discrete blocks, although it is recognized that such programs and components reside at various times in different storage components of the computing device 1701, and are executed by the one or more processors 1703 of the computer. An implementation of the associative data indexing engine software 1706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
generating, by a computing device, based on a plurality of data points of an in-memory data set, a tree structure connecting the plurality of data points and comprising a plurality of edges, each edge having a length;
removing, from the tree structure, at least one edge of the plurality of edges, wherein the length of the at least one edge is greater than or equal to a sum of an average of the lengths of the plurality of edges plus a standard deviation of the lengths of the plurality of edges;
determining, based on a plurality of clusters resulting from the removal of the at least one edge from the tree structure, an inter-group similarity measurement and an intra-group similarity measurement for each cluster of the plurality of clusters, wherein each cluster of the plurality of clusters comprises a respective subset of the plurality of data points;
generating, based on the inter-group similarity measurement and the intra-group similarity measurement for two or more clusters of the plurality of clusters, at least one merged cluster comprising the respective subsets of the plurality of data points associated with the two or more clusters, wherein the at least one merged cluster comprises a convex hull, and wherein the convex hull comprises an internal structure defined by a plurality of hull edges surrounding the respective subsets of the plurality of data points associated with the two or more clusters;
causing, based on the internal structure of the convex hull, a subset of the plurality of hull edges to be split, resulting in an optimized convex hull, wherein each hull edge, of the subset of the plurality of hull edges, does not cut into the internal structure of the optimized convex hull after being split; and
rendering, at a user interface of the computing device, a visual representation of the at least one merged cluster with the optimized convex hull, wherein the visual representation is rendered such that the visual representation does not depict the respective subsets of the plurality of data points associated with the two or more clusters, and wherein the user interface facilitates querying the in-memory data set via interaction with the visual representation.

2. The method of claim 1, wherein generating the tree structure comprises at least one of:
generating, based on a Delaunay triangulation applied to the plurality of data points, a minimum spanning tree (MST);
generating, based on at least one common variable associated with each of the plurality of data points, a plurality of connections for an MST; or
generating, based on at least one distance metric, an MST, wherein the at least one distance metric comprises a Euclidean distance or a Manhattan distance.

3. The method of claim 1, wherein each cluster of the two or more clusters comprises a subset of the plurality of data points.

4. The method of claim 3, wherein the intra-group similarity measurement for each of the two or more clusters is indicative of a level of similarity between data points within the subset.

5. The method of claim 3, wherein the inter-group similarity measurement for each of the two or more clusters is indicative of a level of similarity between that cluster and the remaining clusters of the plurality of clusters.

6. The method of claim 1, further comprising: determining, based on an absence of a predefined number of clusters associated with the removal of the at least one edge from the tree structure, that a supervised classification is to be applied to the plurality of clusters.

7. The method of claim 1, further comprising: determining, based on an absence of a maximum number of clusters associated with the removal of the at least one edge from the tree structure, that a supervised classification is to be applied to the plurality of clusters.

8. A method comprising:
generating, by a computing device, based on a plurality of data points of an in-memory data set, a tree structure connecting the plurality of data points and comprising a plurality of edges, each edge having a length;
removing, from the tree structure, at least one edge of the plurality of edges, wherein the length of the at least one edge is greater than or equal to a sum of an average of the lengths of the plurality of edges plus a standard deviation of the lengths of the plurality of edges;
determining that a plurality of clusters resulting from the removal of the at least one edge from the tree structure is associated with a defined quantity, wherein each cluster of the plurality of clusters comprises a respective subset of the plurality of data points, and wherein the defined quantity of the plurality of clusters comprises a convex hull, wherein the convex hull comprises an internal structure defined by a plurality of hull edges surrounding the respective subsets of the plurality of data points;
causing, for each cluster of the plurality of clusters, based on the internal structure of the convex hull, a subset of the plurality of hull edges to be split, resulting in an optimized convex hull, wherein each hull edge, of the subset of the plurality of hull edges, does not cut into the internal structure of the optimized convex hull after being split; and
rendering, at a user interface, a visual representation of the plurality of clusters with the optimized convex hulls, wherein the visual representation does not depict the respective subsets of the plurality of data points associated with the plurality of clusters, and wherein the user interface facilitates querying the in-memory data set via interaction with the visual representation.

9. The method of claim 8, wherein generating the tree structure comprises generating, based on a Delaunay triangulation applied to the plurality of data points, a minimum spanning tree.

10. The method of claim 8, wherein generating the tree structure comprises:
generating, based on at least one common variable associated with each of the plurality of data points, a plurality of connections for a minimum spanning tree (MST); and
generating, based on the plurality of connections, the MST.

11. The method of claim 8, wherein generating the tree structure comprises generating, based on at least one distance metric, a minimum spanning tree.

12. The method of claim 11, wherein the at least one distance metric comprises a Euclidean distance or a Manhattan distance.

13. The method of claim 8, wherein the defined quantity of the plurality of clusters comprises a maximum quantity of clusters.

14. The method of claim 8, wherein the defined quantity of the plurality of clusters comprises a predetermined quantity of clusters.

15. An apparatus comprising:
one or more processors, and
memory storing processor executable instructions that, when executed by the one or more processors, cause the apparatus to:
generate, based on a plurality of data points of an in-memory data set, a tree structure connecting the plurality of data points and comprising a plurality of edges, each edge having a length;
remove, from the tree structure, at least one edge of the plurality of edges, wherein the length of the at least one edge is greater than or equal to a sum of an average of the lengths of the plurality of edges plus a standard deviation of the lengths of the plurality of edges;
determine, based on a plurality of clusters resulting from the removal of the at least one edge from the tree structure, an inter-group similarity measurement and an intra- group similarity measurement for each cluster of the plurality of clusters, wherein each cluster of the plurality of clusters comprises a respective subset of the plurality of data points;
generate, based on the inter-group similarity measurement and the intra-group similarity measurement for two or more clusters of the plurality of clusters, at least one merged cluster comprising the respective subsets of the plurality of data points associated with the two or more clusters, wherein the at least one merged cluster comprises a convex hull, and wherein the convex hull comprises an internal structure defined by a plurality of hull edges surrounding the respective subsets of the plurality of data points associated with the two or more clusters;
cause, based on the internal structure of the convex hull, a subset of the plurality of hull edges to be split, resulting in an optimized convex hull, wherein each hull edge, of the subset of the plurality of hull edges, does not cut into the internal structure of the optimized convex hull after being split; and
render, at a user interface, a visual representation of the at least one merged cluster with the optimized convex hull, wherein the visual representation is rendered such that the visual representation does not depict the respective subsets of the plurality of data points associated with the two or more clusters, and wherein the user interface facilitates querying the in-memory data set via interaction with the visual representation.

16. The apparatus of claim 15, wherein the processor executable instructions that cause the apparatus to generate the tree structure further cause the apparatus to at least one of:
generate, based on a Delaunay triangulation applied to the plurality of data points, the a minimum spanning tree (MST);
generate, based on at least one common variable associated with each of the plurality of data points, a plurality of connections for an MST; or
generate, based on at least one distance metric, an MST, wherein the at least one distance metric comprises a Euclidean distance or a Manhattan distance.

17. The apparatus of claim 15, wherein each cluster of the two or more clusters comprises a subset of the plurality of data points.

18. The apparatus of claim 17, wherein the intra-group similarity measurement for each of the two or more clusters is indicative of a level of similarity between data points within that cluster and the remaining clusters of the plurality of clusters.

19. The apparatus of claim 18, wherein the inter-group similarity measurement is indicative of a level of similarity between each subset.

20. The apparatus of claim 15, wherein the processor executable instructions further cause the apparatus to determine, based on an absence of a predefined number of clusters associated with a result of a coarse classification, or based on an absence of a maximum number of clusters associated with the removal of the at least one edge from the tree structure, that a supervised classification is to be applied to the plurality of clusters.

* * * * *